Aug. 11, 1959          R. H. WEILAND          2,899,152
AIRCRAFT CONTROL SURFACE OPERATING MECHANISM
Filed May 16, 1955                         3 Sheets-Sheet 1
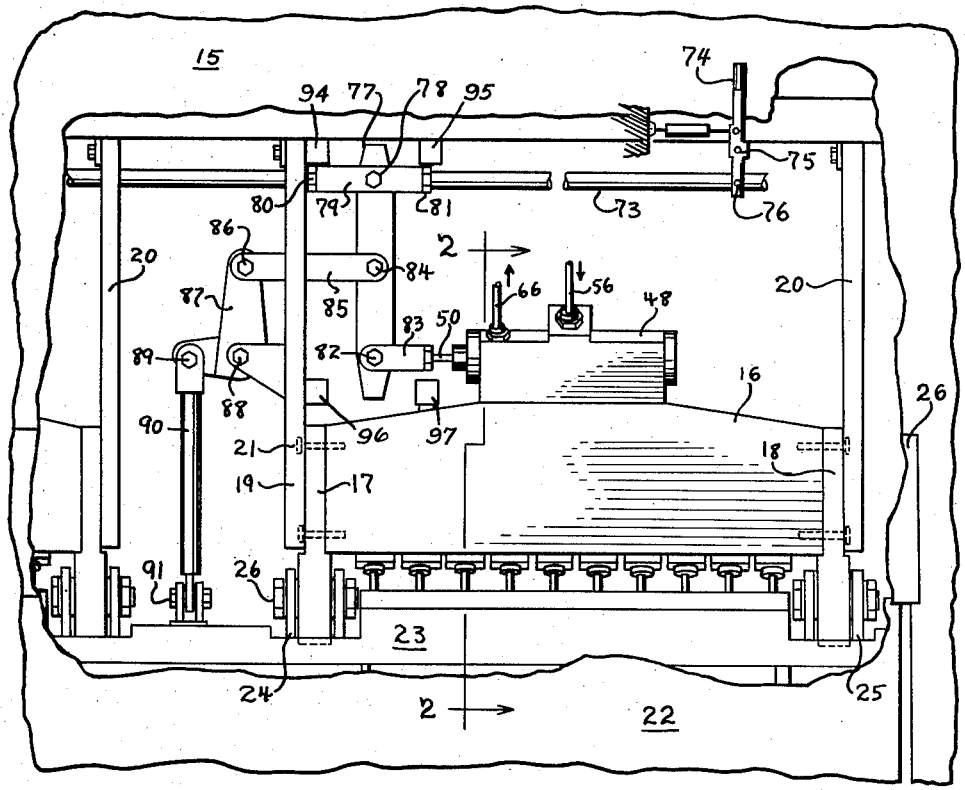
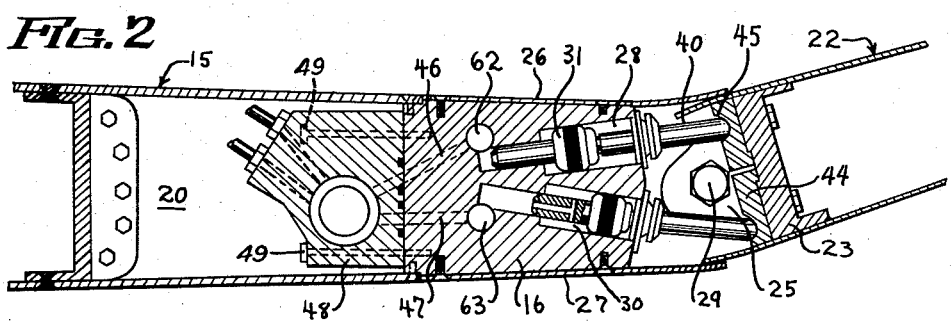
RICHARD H. WEILAND
INVENTOR.
ATTORNEY Aug. 11, 1959 R. H. WEILAND 2,899,152
AIRCRAFT CONTROL SURFACE OPERATING MECHANISM
Filed May 16, 1955 3 Sheets-Sheet 2
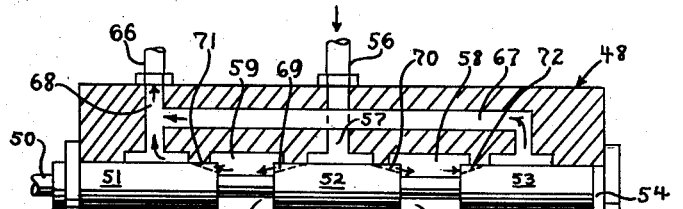
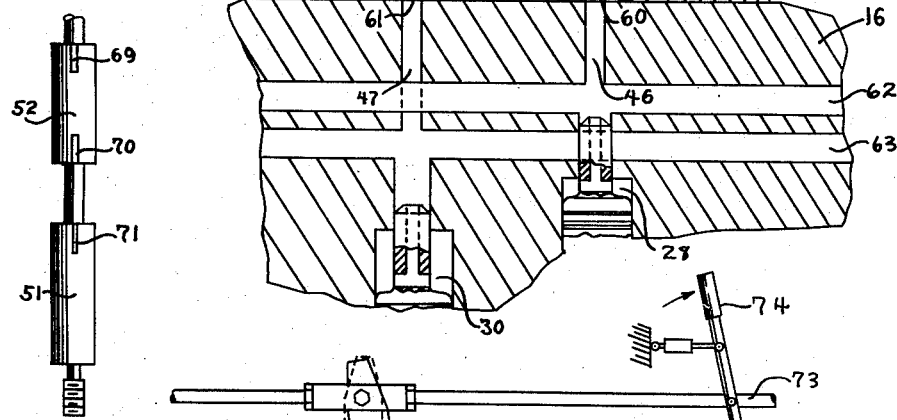
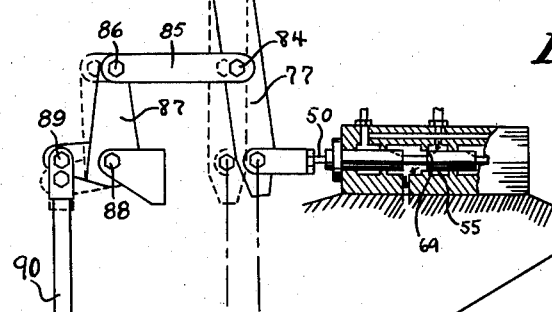
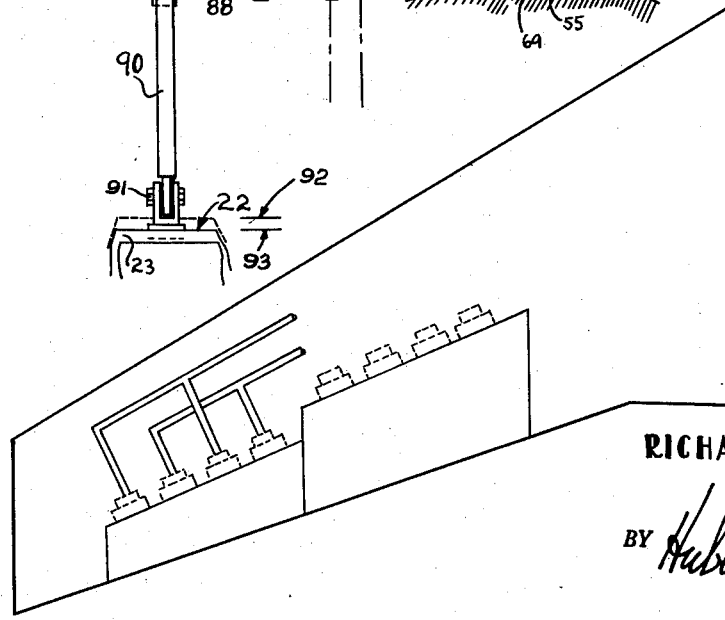
RICHARD H. WEILAND
INVENTOR.
BY
ATTORNEY Aug. 11, 1959 R. H. WEILAND 2,899,152
AIRCRAFT CONTROL SURFACE OPERATING MECHANISM
Filed May 16, 1955 3 Sheets-Sheet 3
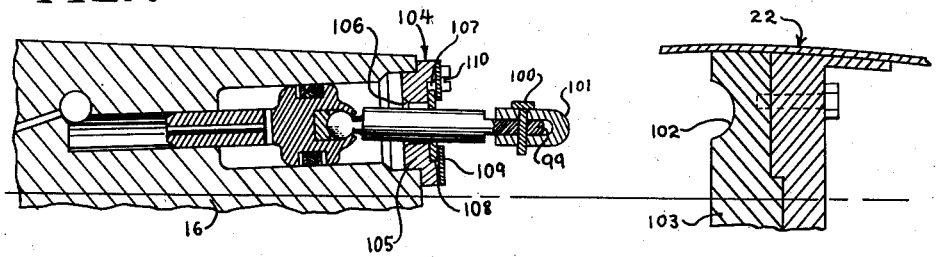
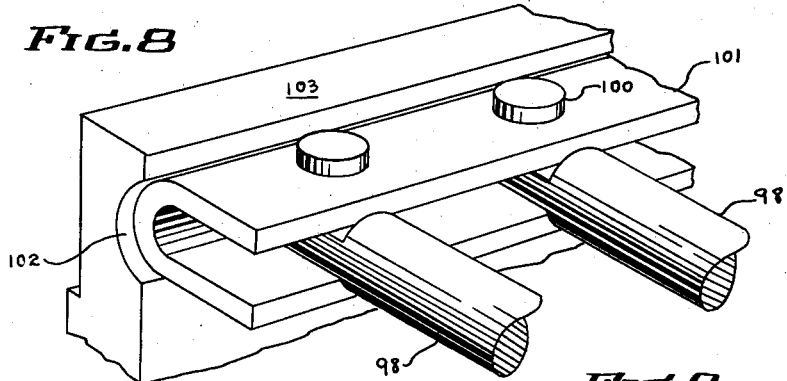
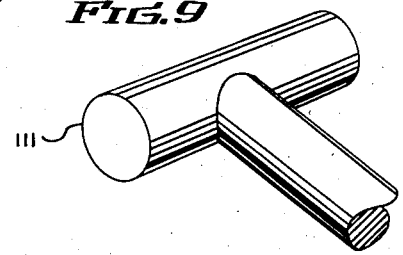
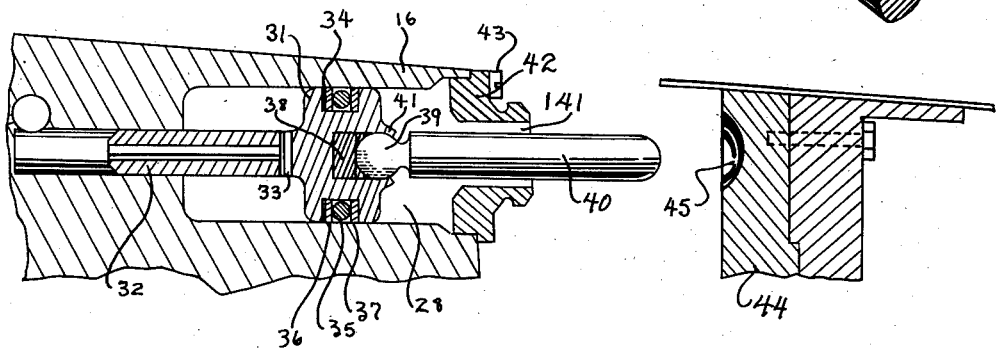
RICHARD H. WEILAND
INVENTOR.
BY *Hubert Miller*
ATTORNEY

United States Patent Office 2,899,152
Patented Aug. 11, 1959

2,899,152

AIRCRAFT CONTROL SURFACE OPERATING MECHANISM

Richard H. Weiland, Wichita, Kans., assignor to Boeing Airplane Company, Wichita, Kans., a corporation of Delaware Application May 16, 1955, Serial No. 508,701

5 Claims. (Cl. 244—85)

This invention relates generally to aircraft and more particularly to improvements in mounting control airfoils on fixed airfoils and in operating means for control airfoils.

In aircraft designed to fly at supersonic speeds extremely thin section supporting and controlling airfoils are considered a necessity. Deflection of the control airfoils of an airplane flying at supersonic speeds requires the application of a relatively large force due to the extreme speed of the airstream into which the airfoil must be deflected, and the consequent resistance of the airfoil to such deflection. The extreme thinness of the wing at the hinge axis of the control airfoil dictates that the airfoil deflecting force be applied through a relatively short moment arm, else there would be a considerable aerodynamic drag penalty due to the projection of parts of the deflecting mechanism into the airstream. Furthermore, when the design is such that the deflecting force is applied at only one end, or even at both ends, of the hinge axis of the control airfoil, its internal structure must be of great strength to withstand the bending loads created by deflection of the airfoil into the airstream.

Primary objects of this invention are to provide a control airfoil deflecting or operating mechanism which is capable of being wholly contained within the contours of an extremely thin airfoil section; a mechanism which evenly distributes the deflecting moment along the entire length of the control airfoil hinge axis thereby practically eliminating any tendency for the deflected airfoil to be distorted by applied airstream loads, and thus permitting the use of a minimum of internal airfoil structure to provide adequate strength; a mechanism which exerts a continuous and positive force on both sides of the control airfoil hinge axis even during its movement, thereby preventing flutter and eliminating the need for any mass balancing means, such application of force on opposite sides of the hinge axis also eliminating play at all load carrying bearing surfaces; a fluid actuated control airfoil servo mechanism which is capable of producing greater than adequate airfoil hinge movements for all aircraft flight conditions, and which is so constructed as to provide the greatest frictional resistance to airfoil movement at zero airfoil hinge moment at which time maximum stability is desirable, as opposed to conventional servo systems which provide virtually no frictional resistance at zero moment, when it is most needed; a mechanism in which the overall friction is relatively low, and decreases as the hinge moment increases; a hydraulic servo mechanism which requires neither hydraulic hose nor hydraulic swivel joint connections between the fixed and the movable airfoils; a mechanism which affords a considerable weight reduction in the control airfoil hinge mounting by embodying the hinge axis support bearings.

In addition, it is an important object to provide a hydraulic control airfoil actuating mechanism which provides a high degree of operational safety because it includes a plurality of separate actuator units closely spaced along the control airfoil hinge axis, alternate units being operable hydraulically independent of the others, each alternate group being capable of deflecting the control airfoil independent of the other units, in case of emergency, and all actuator units being simultaneously controlled by a single pilot operable control element.

Other objects are to provide a hydraulic control airfoil actuating mechanism which is operational through a maximum of temperature variations; which is relatively simple to manufacture; which permits the control airfoil to be completely separated from the fixed airfoil by the simple removal of hinge bolts because there are no other connections between the two airfoils; and which provides a hinge connection for the control airfoil which eliminates any open gap between the fixed and movable airfoils, thus preventing airflow from one side of the composite airfoil to the other, even at maximum deflection of the movable airfoil, and thus disturbing the airflow along the surface of the composite airfoil a minimum amount.

The invention, together with other objects, will be more clearly understood when the following description is read in connection with the accompanying drawings, in which:

Fig. 1 is a plan view of an actuator unit embodying my invention installed in an airplane wing and hingedly connecting control airfoil thereto, the wing and control airfoil being shown only fragmentarily;

Fig. 2 is a vertical longitudinal sectional view of the Fig. 1 actuator unit, and is taken along the line 2—2 of Fig. 1;

Fig. 3 is a horizontal longitudinal sectional view through the actuator unit illustrating details in the construction of a preferred form of hydraulic control valve;

Fig. 4 is a fragmentary side view of a valve element constituting a part of the Fig. 3 control valve, and shows further construction details;

Fig. 5 is a schematic view illustrating the operation of a preferred form of hydraulic follow-up linkage between the control valve and the movable airfoil;

Fig. 6 is a diagrammatic plan view of an airplane wing showing a plurality of the actuator units of my invention installed therein to separately move two control airfoils;

Fig. 7 is a fragmentary vertical longitudinal sectional view of an actuator unit showing a modified construction for transmitting movement from the actuator pistons to the control airfoil;

Fig. 8 is a fragmentary perspective view further illustrating the modified construction shown in Fig. 7;

Fig. 9 is a fragmentary perspective view of a third means for transmitting movement from the actuator pistons to the control airfoil; and Fig. 10 is an enlarged fragmentary longitudinal sectional view through one of the cylinders and piston assemblies shown in Fig. 2.

General description

Referring to the drawing, and more especially to Figs. 1 and 2 thereof, the invention generally comprises a spanwise elongated actuator unit rigidly supported between wing ribs adjacent the trailing edge of the wing. The unit includes hinge fixtures for connecting the leading edge of the control airfoil thereto. It is contemplated that a plurality of such units will be arranged end to end along the entire axis of the airfoil to be actuated, as clearly shown in Fig. 6.

Each actuator unit includes an upper and a lower row of closely spaced fore and aft disposed pistons, the two rows lying in planes on opposite sides of the hinge axis but wholly between the upper and lower surfaces of the wing. Means are provided to transmit movement from each row of pistons to a transversely extending plate constituting a part of the control airfoil leading edge. Pressure and return ducts connect the various piston cylinders to a single pilot controlled valve so that the pistons in one row may simultaneously be moved outward to transmit an airfoil deflecting force to said plate on one side of the hinge line, while the pistons on the other side of the hinge line are permitted movement in the opposite direction under back pressure which resists such airfoil movement.

A follow-up linkage connects the movable element of the valve to the leading edge of the movable airfoil so that the movable element of the valve is automatically returned to a neutral position by the time the airfoil completes its pilot directed movement in any direction.

Details of construction

Figures 1 and 2 of the drawings illustrate an actuator unit embodying the invention installed in the trailing edge of a wing 15, the upper wing skin being cut away in Fig. 1 to disclose the installation. The actuator unit includes an elongated cylinder block 16 to the opposite ends of which are attached rearwardly projecting hinge fixtures 17 and 18. The cylinder block and the hinge fixtures are secured rigidly between the aft ends of a pair of cordwise disposed wing ribs 19 and 20 by means of bolts 21. The leading edge of a control airfoil 22 includes a spar 23 a forward surface of which rigidly carries properly spaced hinge clevises 24 and 25. The hinge joint is completed by hinge bolts 26 passing through the clevises 24 and 25 and through the hinge fixtures 17 and 18, respectively. As previously mentioned it is contemplated that a plurality of these units will be placed end to end parallel to the hinge axis to properly support the leading edge of the control airfoil, as clearly shown in Fig. 6.

As a means of preventing the flow of air from the lower side of the wing to the upper side, or vice versa, through the gap that normally is present between a fixed and a control airfoil, the above hinge joint preferably includes upper and lower skin panels 26 and 27 at the extreme trailing edge of the fixed airfoil. These skin panels 26 and 27 are preferably flexible and their aft edges project rearwardly beyond the fixed structure of the wing a short distance, as clearly shown in Fig. 2. Similarly the extreme forward edges of the skin panels which cover the movable airfoil 22 project forwardly beyond the fixed structure of the control airfoil, and are sandwiched between the free edges of the two panels 26 and 27. The air gap between the two airfoils is thus completely closed and remains closed and virtually sealed during movement of the control airfoil 22.

Referring now to the details of construction of the actuator itself, the cylinder blocks 16 include an upper row of counterboard cylinders 28, the axes of which lie in a plane which is spaced above the hinge axis 29. Similarly, the cylinder block includes a lower row of counterbored cylinders 30, the axes of which lie in a plane spaced below the hinge axis 29. As clearly shown in Fig. 1, the cylinders are closely spaced along the hinge axis. Each of the cylinders is provided with a floating piston 31, all of which are identical. Referring to Fig. 10 it will be seen that each piston includes a longitudinally bored guide stem 32, the bore of which communicates with a cross-bore 33 adjacent the piston proper. The piston is provided with an annular groove 34 in which is seated a conventional flexible O-ring 35 and a pair of back-up rings 36 and 37 to reduce the tendency of the O-ring 35 to be extruded between the piston and the cylinder wall under pressure. The aft end of the piston is bored and the bore is provided with a self-lubricating bearing insert 38 and forms a ball joint socket for the spherical head 39 of a push rod 40. The aft end of the piston is provided with a rearwardly projecting short collar 41 which is swaged slightly to retain the spherical head 39. The push rod projects through a central bore 141 in a combination cylinder cap and push rod guide 42 which is held in position by means of studs 43. The bore 141 is concentric with the longitudinal axis of the piston 31, but is larger in diameter than the push rod 40 to permit limited universal movement for the push rod.

As can be clearly seen in Fig. 2 the leading edge surface of the spar 23 of the control airfoil is provided with a heavy metal plate 44 which extends spanwise between each pair of hinge clevises 24 and 25. The forward surface of plate 44 is provided with two hingewise extending rows of recessed push rod seats of hyperbolic section, the seat openings being of slightly larger diameter than the received ends of the push rods 40. The seats are properly spaced and positioned to receive the aft ends of the push rods, one row of seats being above the hinge line 29 and the other row below that hinge line. The seats are designated by the numeral 45. With the arrangement described it will be seen that the control airfoil 22 may be disconnected from the fixed airfoil 15 by the simple removal of the hinge bolts 25 and 26. As the aft ends of the push rods leave the seats 45 in the control airfoil, the rods gravitate to the lower surface of the bore 141 in the guides 42. Due to the shape of the seats 45 it is a very simple matter to re-install the control airfoil on the fixed airfoil, the aft ends of the push rods 40 simply centering themselves in the respective seats.

The forward ends of the counterbores of the respective cylinders 28 and 30 are connected by means of ducts 46 and 47 with a control valve 48. With the arrangement thus described it will be seen that if the pistons 31 in the upper row of cylinder 28 are forced aft simultaneously and the pistons in the lower row of cylinders 30 are permitted to travel in the opposite direction simultaneously, the control airfoil 22 will be forced to move clockwise (in Fig. 2) about its hinge axis 29. Also that if the forward movement of the pistons in the row of cylinders 30 is resisted by hydraulic back pressure during this movement the control airfoil will be prevented from "fluttering" due to airstream loads. The hydraulic system for controlling such movement will now be described.

Valve and follow-up construction

While any hydraulic valve of suitable design may be used to control the above described actuator unit, a valve of preferred construction is illustrated in Figs. 2 to 5 inclusive. It is preferred because it is capable of maintaining a continuous hydraulic pressure on all the pistons in both rows regardless of their relative positions in the cylinders, and is also capable of maintaining a continuous back pressure on either row of pistons while the pressure fluid is being forced into the return line from their respective cylinders by outward movement of the other row of pistons.

The valve casing is secured in a suitable manner, as by studs 49, to the forward edge of cylinder block 16. The valve includes a reciprocable element 50 (Fig. 3) which carries three spaced enlarged diameter pistons or valve heads 51, 52, and 53 which snugly fit and are slidable in a longitudinal bore 54 in the casing.

Intermediate the ends of the bore 54 and concentric therewith, the casing is provided with an enlarged diameter fluid pressure feed port 55 which communicates with a fluid pressure supply line 56 by means of a duct 57. Port 55 is lesser in length than the central valve head 52.

On opposite sides of the port 55 and spaced therefrom are a pair of similar concentric enlarged diameter pressure fluid distributing ports 58 and 59, which respectively communicate with ducts 46 and 47 in the cylinder block by means of registering ducts 60 and 61 in the valve casing. It will be noted that duct 46 communicates with a header duct 62 in the cylinder block 16, and that the header 62 communicates with the counterbore of each upper row cylinder 28. Similarly, duct 47 communicates with a header duct 63 which communicates with the counterbore of each lower row cylinder 30.

Near its opposite ends, and spaced outward respectively from the distributing ports 58 and 59, the valve casing has pressure fluid return ports 64 and 65 which communicate with a return conduit 66 by means of ducts 67 and 68.

Referring particularly to Figs. 3 and 4, it will be seen that the central valve head 52 is provided at its opposite ends with fluid metering slots 69 and 70, greater in depth at their outer ends than at their inner ends, as indicated by the broken lines in Fig. 3. At their inner ends only, valve heads 51 and 53 are provided with similar fluid metering slots 71 and 72, which are narrower than slots 69 and 70 and therefore provide a lesser fluid flow area.

When the slidable valve element 50 is in neutral position the inner ends of slots 69 and 70 communicate minutely with port 55, as shown in Fig. 3. Similarly, the smaller ends of slots 71 and 72 in heads 51 and 53 communicate minutely with return ports 65 and 64. A continuous but very minute flow of pressure fluid is therefore provided from feed port 55 to distributing ports 58 and 59 and thence to return ports 64 and 65. Since the slots 71 and 72 are smaller than slots 69 and 70, a continuous fluid pressure is therefore maintained on the pistons in both rows of cylinders. This is an important feature of my invention, because the difference in flow area provided by the mentioned slots also serves to maintain a back pressure on the pistons in either row while the pistons in the other row are being moved outward to deflect the airfoil. Flutter of the control airfoil is thus prevented while it is in any stationary position of deflection or is in neutral, as well as during the actual deflecting movement.

Again referring to Fig. 1, the valve operating linkage includes a control rod 73 of sufficient length to service whatever number of actuator units are installed to deflect the particular control airfoil, in this case four units. Rod 73 extends parallel to the hinge line and is reciprocable by means of a pilot controlled member 74, illustrated as a simple lever pivotally mounted at 75 on a fixed pivot. The lower end of lever 74 is pivotally connected to rod 73 at 76.

A link 77 has one end pivotally connected at 78 to a sleeve 79 which is adjustable lengthwise on rod 73 by means of nuts 80 and 81. The other end of link 77 is pivotally connected at 82 to a valve element 50 by means of a clevis 83.

Intermediate its ends link 77 is pivotally connetced at 84 to one end of a short link 85, the other end of which is pivotally connected at 86 to one arm of a bell crank 87. Bell crank 87 is mounted on a fixed pivot 88, and its other arm is pivotally connected at 89 to one end of a link 90. The other end of link 90 is pivotally connected at 91 to the leading edge of the movable airfoil 22 at a point well to one side of the hinge line 29, in this case below the hinge line so that link 90 is forced to move longitudinally as the airfold moves in either direction about its axis.

Linkage such as above described is duplicated for each actuator unit installed. It will thus be understood that the valve elements 50 of all actuator units are simultaneously moved in the same sense by the single rod 73, and that all valve elements 50 are likewise simultaneously moved in the same sense by the respective linkage assemblies when the control surface is deflected in either direction.

Operation

Referring to Fig. 5, as lever 74 is moved clockwise link 77 is initially moved counter-clockwise about its pivot 84, which pivot initially serves as a fixed pivot due to resistance of the control airfoil to deflection.

Counterclockwise movement of link 77 forces valve element 50 to the right in Fig. 5. Slot 69 in valve head 52 affords free flow of pressure fluid from feed port 55 into distributing port 59 and thence through the duct 47 and header 63 into the lower row of cylinders 30 in each actuator unit. All lower row push rods 40 are consequently moved outward by their respective pistons 31, and the control airfoil 22 is forced to move upward (counterclockwise in Fig. 2) about its hinge axis 29.

Simultaneously plate 44 forces the upper row of push rods 40 to move in the opposite direction, upper row pistons 31 moving with their respective push rods, forcing liquid in the upper row cylinders out into header 62, duct 46, distributing port 58 and through slot 72 and duct 67 into the return line 66. There is a fluid pressure resistance to such upward movement of the control airfoil, however, because slot 72 provides less fluid flow area than slot 69, this will be clearly understood by those familiar with this art.

As the control airfoil is deflected upward, its leading edge spar 23 moves from the position shown in Fig. 5 in solid lines to the position shown in broken lines, a distance indicated by the lines 92 and 93. During such movement of the control airfoil link 90 forces bell crank 87 to pivot to the dotted line position indicated, and link 77 is thereby moved to the dotted line position shown, returning valve element 50 to its neutral position, as shown in Fig. 3. The return of the valve to neutral is thus automatic, and occurs without any additional movement of lever 74 by the pilot. Actually the movement occurs and is completed at just about the time the pilot ceases to move lever 74. The valve is thus always in condition to direct movement of the control airfoil in either direction about its axis, within limits, of course. To limit control airfoil travel fixed stops 94, 95, 96, and 97 (Fig. 1) are provided. Stops 94 and 95 serve to limit the travel of rod 73, while stops 96 and 97 limit the travel of the aft end of link 77.

In addition to the objects and advantages of the invention previously mentioned, it should be noted that the actuator unit described provides a minimum length of liquid column between the pistons and the control valve 50, which materially increases rigidity. Also that metering of the liquid is accomplished on the return side of the control valve which assures that all push rods not only remain in continuous contact with the control airfoil plate 44, but exert a continuous pressure or thrust against that plate, even when the push rods are retracting. The control airfoil is thus prevented from "fluttering" due to variable pressures on its opposite surfaces. Additionally it should be observed that since hydraulic pressure is always exerted on only one side of each piston, the O-ring 35 and its back-up rings 36 and 37 are continuously maintained at the aft end of the piston groove in which they are seated, even when the piston is moving outward in its cylinder. This greatly reduces wear on the O-ring and provides long leak free life for the system.

Referring now to certain modified details in construction, Figs. 7 and 8 illustrate a means for better distributing the push rod thrust along the forward plate of the control airfoil. To this end the outer or aft ends of the respective push rods 98 are flattened as at 99 and are anchored by means of pins or bolts 100 in the channel of a channel member 101. This channel member is elongated spanwise and its aft edge is adapted to seat in a spanwise extending larger groove 102 in the plate 103, which is secured to the leading edge of control airfoil 22. This distribution of the thrust through the channel member to the plate reduces the per square unit load on the contacted plate area by approximately 77%, as proven by actual tests. This reduces friction, galling of contacting surfaces, etc.

Fig. 7 also illustrates a different type of combination cylinder cap and push rod guide 104. It includes a cylinder plug 105 having a central bore 106 larger in diameter than the push rod 98, and a counterbore 107. A dust plate 108 seats in counterbore 107, and since the plate is smaller in diameter, it has limited movement in all directions normal to the counterbore axis. Dust plate 108 has a central perforation which tightly receives push rod 98. The plate is held on its seat in the counterbore by a flat washer 109 secured by bolts 110, which also serve to hold the entire assembly in position on the cylinder block 16. The central perforation in washer 109 is larger in diameter than the push rod 98 but smaller in diameter than the outside diameter of dust plate 108.

Fig. 9 illustrates a modified design for the outer end of a push rod. It includes an integral T-bar 111 adapted to extend spanwise and seat in the groove 102. This design also better serves to distribute the push rod thrust spanwise along plate 103, with results similar to those provided by the Fig. 7 arrangement.

Having described the invention with sufficient clarity to enable those familiar with this art to construct and use it, I claim:

1. In an airplane flight control system of the class wherein a deflectable control airfoil is hinged along its leading edge to the trailing edge of a fixed airfoil by means of co-axial spanwise spaced hinge joints, the common axis of said joints being located centrally with respect to the opposite side surfaces of said airfoils, a mechanism for deflecting the control airfoil about its hinge axis comprising: a spanwise elongated rigid plate or spar constituting a major portion of the leading edge of the movable airfoil, that surface of the plate which faces the hinge joint having spaced recessed actuator seats formed therein along the respective marginal portions thereof; an elongated unitary cylinder block rigidly secured in the trailing edge of the fixed airfoil extending along said hinge axis and located between adjacent hinge joints; two spaced rows or banks of cylinders in said block, both rows extending along the hinge axis with the longitudinal axes of said cylinders disposed fore and aft, the respective rows lying in spaced planes which intersect the rigid plate of the movable airfoil within its contours and on opposite sides of said hinge axis; a plunger in each of said cylinders; rigid fore and aft movable airfoil actuators spanning the space between and in contact with plungers in the respective rows and with corresponding seats in said rigid plate on opposite sides of the hinge axis for transmitting thrust from the plungers in the respective rows to said plate to deflect the control airfoil about its hinge axis; and means for introducing hydraulic fluid under pressure into a selected row of said cylinders to simultaneously force the corresponding plungers and actuators to move toward the rigid plate and for simultaneously withdrawing fluid under back pressure from the other row of cylinders, with a consequent equal movement of the other row of plungers and actuators in an opposed direction, such actuator movement resulting in deflection of the controlled airfoil in one direction about its hinge axis.

2. The mechanism described in claim 1 in which the means for introducing hydraulic fluid includes a valve; fluid pressure and return lines connected to said valve; fluid delivery and return ducts connecting each of said cylinders with said valve; and fluid by-pass ducts in said valve affording a minute continuous flow of fluid under pressure to all of said cylinders and into the return line to maintain a continuous pressure on all said plungers to continuously urge all said actuators into positive contact with said rigid plate or spar during deflection thereof, whereby flutter of the movable airfoil is prevented regardless of its relative position or movement.

3. In an airplane flight control system of the class wherein a deflectible control airfoil is hinged along its leading edge to the trailing edge of a fixed airfoil by means of co-axial spanwise spaced hinge joints, the common axis of said joints being located centrally with respect to the opposite side surfaces of said airfoils, a mechanism for deflecting the control airfoil about its hinge axis comprising: a first row of spanwise spaced fore and aft reciprocable fluid pressure actuated coacting plungers located within the airfoil contours and mounted in the hinge edge of one of said airfoils and movable toward and away from the hinge edge of the other airfoil in a plane spaced to one side of the hinge axis; a second row of spanwise spaced fore and aft reciprocable fluid pressure actuated co-acting plungers also mounted within the airfoil contours and in the hinge edge of said one of said airfoils and also movable toward and away from the adjacent hinge edge of the other airfoil in a plane spaced to the other side of the hinge axis; thrust transmitting means, located and operable entirely within the airfoil contours, in contact with the plungers in said first row and with a corresponding marginal portion of the adjacent hinge edge of the other airfoil for transmitting thrust thereto from said first row of plungers; similar thrust transmitting means, also located and operable entirely within the airfoil contours, in contact with the plungers in said second row and with a corresponding opposite marginal portion of the adjacent hinge edge of the other airfoil for transmitting thrust thereto from said second row of plungers; means connecting both rows of plungers to a fluid pressure supply line and to a fluid pressure return line; and fluid flow control means for selectively directing the flow of pressure fluid from the supply line to the respective plungers in either row while simultaneously affording and resisting the flow of fluid from the respective plungers in the other row into the return line, whereby the thrust transmitting means on one side of the hinge axis is caused to resist movement of the control surface by the thrust transmitting means on the other side of the hinge axis, and the movable airfoil is thereby prevented from fluttering or oscillating about its hinge axis due to variable air loads, regardless of its direction of movement about the hinge axis.

4. In an airplane flight control system of the class wherein a deflectible control airfoil is hinged along its leading edge to the trailing edge of a fixed airfoil by means of co-axial spanwise spaced hinge joints, the common axis of said joints being located centrally with respect to the opposite side surfaces of said airfoils, a mechanism for deflecting the control airfoil about its hinge axis comprising: an elongated unitary cylinder block disposed spanwise along and within the hinged edge of one of said airfoils and secured rigidly thereto between a pair of adjacent hinge joints; an elongated spanwise disposed rigid plate rigidly carried by the hinged edge of the other airfoil in a location immediately adjacent the hinge axis and at the same relative location spanwise as the cylinder block; two rows of spanwise spaced fore and aft disposed cylinders defined by said cylinder block, one row located adjacent each opposite side surface of the block and in planes parallel to and on opposite sides of the hinge axis; reciprocable plungers in said cylinders; separate fore an aft disposed rigid thrust transmitting means located wholly within the airfoil contours, engaging the plungers in the respective rows and also engaging corresponding marginal portions of said rigid plate on opposite sides of the hinge axis, said means being selectively movable toward the plate by the respective rows of plungers to deflect the control airfoil in either direction about its hinge axis; means collectively connecting the respective rows of cylinders to a fluid pressure supply line and to a fluid pressure return line; and fluid flow control means for directing the flow of pressure fluid from the supply line to all the plungers in one row while simultaneously affording and resisting flow of fluid from all the plungers in the other row into the return line, whereby one thrust transmitting means is caused to resist movement of the control surface about its hinge axis by the other thrust transmitting means, and the movable airfoil is thereby prevented from fluttering or oscillating about its hinge axis due to variable air loads.

5. In an airplane flight control system of the class wherein a deflectible control airfoil is hinged along its leading edge to the trailing edge of a fixed airfoil by means of co-axial spanwise spaced hinge joints, the common axis of said joints being located centrally with respect to the opposite side surfaces of said airfoils, a mechanism for deflecting the control airfoil about its hinge axis comprising: an elongated cylinder block disposed spanwise within one of said airfoils and secured thereto rigidly between a pair of adjacent hinge joints; an elongated spanwise disposed rigid plate rigidly carried by the other airfoil in a location immediately adjacent the hinge axis and at the same relative location spanwise as the cylinder block; two rows of spanwise spaced fore and aft disposed cylinders defined by said cylinder block, one row adjacent each opposite side surface of the block carrying airfoil, the two rows being in spaced planes located on opposite sides of the hinge axis; reciprocable plungers in said cylinders; separate fore and aft disposed rigid thrust transmitting means extending from the plungers in each row into engagement with the rigid plate on the other airfoil, each said means engaging the plate on a different side of the hinge axis and being movable by its respective row of plungers; means connecting the respective rows of cylinders to a fluid pressure supply line and to a fluid pressure return line; fluid flow control means including flow orifices of different flow area for simultaneously affording a relatively large volume flow of pressure fluid from the supply line to all the plungers in either selected row while metering the flow of pressure fluid to the return line from all the plungers in the other row through a flow orifice affording smaller volume flow, to thus maintain a back pressure against movement of the plungers in the said selected row, whereby one thrust transmitting means is caused to resist movement of the control airfoil by the other thrust transmitting means, and flutter of the control airfoil about its hinge axis due to variable air loads against its surfaces in thereby prevented.

References Cited in the file of this patent

UNITED STATES PATENTS

| | | |
|---|---|---|
| 1,935,004 | Winther | Nov. 14, 1933 |
| 2,514,639 | Haack | July 11, 1950 |
| 2,619,304 | Feeney et al. | Nov. 25, 1952 |
| 2,721,714 | Clifton | Oct. 25, 1955 |

FOREIGN PATENTS

| | | |
|---|---|---|
| 730,561 | Great Britain | May 25, 1955 |
| 782,527 | France | June 6, 1935 |